United States Patent [19]

Oyama et al.

[11] Patent Number: 5,094,472
[45] Date of Patent: Mar. 10, 1992

[54] CAMBER CONTROL SYSTEM FOR MOTOR VEHICLE

[75] Inventors: Yasuharu Oyama; Junko Kurosawa; Tsuyoshi Sato; Masaru Abe; Toru Yasuda, all of Saitama, Japan

[73] Assignee: Honda Giken Kogyo Kabushiki Kaisha, Tokyo, Japan

[21] Appl. No.: 519,580

[22] Filed: May 9, 1990

Related U.S. Application Data

[60] Division of Ser. No. 290,851, Dec. 28, 1988, Pat. No. 4,971,348, which is a continuation of Ser. No. 51,846, May 18, 1987, abandoned.

[30] Foreign Application Priority Data

May 16, 1986 [JP] Japan .................. 61-112189
May 16, 1986 [JP] Japan .................. 61-112190

[51] Int. Cl.⁵ .............................................. B62D 17/00
[52] U.S. Cl. ..................................... 280/661; 280/668; 280/673; 280/675
[58] Field of Search ............... 280/661, 668, 673, 675, 280/112.2, 755; 267/220, 221

[56] References Cited

U.S. PATENT DOCUMENTS

| | | | |
|---|---|---|---|
| 3,199,837 | 8/1965 | Vestal et al. | 280/661 |
| 3,497,233 | 2/1970 | Bolaski | 280/661 |
| 3,751,061 | 8/1973 | Scheuerpflug | 280/661 |
| 4,191,274 | 3/1980 | Goldberg et al. | 280/661 |
| 4,286,797 | 9/1981 | Mekosh, Jr. et al. | 280/149.2 |
| 4,371,191 | 2/1983 | Goldberg et al. | 280/661 |
| 4,372,575 | 2/1983 | Hyma | 280/673 |
| 4,546,997 | 10/1985 | Smyers | 280/112.2 |
| 4,700,972 | 10/1987 | Young | 280/661 |
| 4,779,855 | 10/1988 | Tanaka | 267/221 |
| 4,895,383 | 1/1990 | Abe et al. | 280/661 |

FOREIGN PATENT DOCUMENTS

| | | |
|---|---|---|
| 1009 | 3/1979 | European Pat. Off. . |
| 174007 | 3/1986 | European Pat. Off. . |
| 525880 | 5/1955 | Italy ......... 280/661 |
| 60-193781 | 10/1985 | Japan . |
| 1240675 | 6/1986 | U.S.S.R. ......... 280/661 |
| 1526970 | 10/1978 | United Kingdom . |
| 2155869 | 10/1985 | United Kingdom . |

Primary Examiner—Kenneth R. Rice
Assistant Examiner—Tamara L. Finlay
Attorney, Agent, or Firm—Irving M. Weiner; Joseph P. Carrier; Pamela S. Burt

[57] ABSTRACT

A camber control system varies the camber of a wheel of a motor vehicle. The camber control system includes a detector for detecting a direction in which front wheels are steered, a controller for producing a control signal in response to a signal produced by the detector, an actuator operable in response to the control signal from the controller, and a rear wheel camber varying mechanism actuatable by the actuator for varying the camber of rear wheels. The controller is arranged such that the control signal produced thereby enables the actuator to operate the rear wheel camber varying mechanism so that the camber of outer and inner rear wheels with respect to a motor vehicle turning direction corresponding to the direction in which the front wheels are steered, is rendered negative and positive, respectively. The rear wheel camber varying mechanism has a wheel supporting member for supporting a rear wheel rotatably thereon, and lower and upper coupling members interconnecting the wheel supporting member and a body of the motor vehicle. The upper coupling member is movable transversely of the motor vehicle body, and the actuator is coupled to a portion of the upper coupling member which is mounted on the motor vehicle body.

5 Claims, 6 Drawing Sheets

CAMBER CONTROL SYSTEM FOR MOTOR VEHICLE

This is a divisional of application Ser. No. 290,851 filed Dec. 28, 1988 now U.S. Pat. No. 4,971,348 as a file-wrapper continuation of prior application Ser. No. 051,846 filed on May 18, 1987 (now abandoned).

BACKGROUND OF THE INVENTION

1. Field of the Invention

The present invention relates to a system for variably controlling the camber of wheels of a motor vehicle.

2. Description of the Relevant Art:

A camber control system for variably controlling the camber of wheels of a motor vehicle according to the speed of travel of the motor vehicle for improving the turning performance thereof is disclosed in Japanese Laid-Open Patent Publication No. 60-193781 (corresponding to U.S. patent application Ser. No. 711,977).

The disclosed camber control system controls the two laterally spaced wheels so that their camber will be negative when the vehicle speed exceeds a prescribed speed level, irrespective of the direction in which the wheels are steered. With negative camber, camber thrusts acting on the wheels are canceled out in the same manner as when the wheels would be set to ordinary invariable camber, and such camber thrusts cannot be utilized positively as cornering forces. More specifically, since the camber of both of two laterally spaced wheels is made negative, the camber thrust on an outer wheel while the motor vehicle is making a turn is increased, thus improving the turning performance of the motor vehicle. However, inasmuch as camber thrusts are not produced in response to steering action, the steering response as when a straight traveling motor vehicle is to change its course is insufficient.

In the above disclosed system, a wheel supporting member of a strut-type suspension is tiltable transversely of the vehicle body, and an actuator is connected to the wheel supporting member for varying the camber of the wheel. If the actuator were coupled to a lower arm of the suspension, the actuator would be required to produce a large driving force to swing or move the wheel supporting member or the lower arm in the transverse direction of the vehicle body. Further, the actuator tends to be adversely affected by dust, water or other foreign matter since the wheel supporting member and the lower arm are positioned in a lower portion of the vehicle body.

SUMMARY OF THE INVENTION

It is a first object of the present invention to provide a camber control system which is responsive to steering operation for producing camber thrusts on rear wheels in the direction in which the motor vehicle makes a turn for thereby improving the turning performance of the motor vehicle and the steering response at the time the motor vehicle, as it is traveling changes its course.

A second object of the present invention is to provide a camber varying device suitable for use in the above camber control system, the camber varying device causing only a small change in the bump rebounding characteristics of a suspension and being constructed of almost all components of an existing suspension without modification.

A camber control system for a motor vehicle according to the present invention comprises detector means for detecting a direction in which front wheels are steered, control means for producing a control signal in response to a signal produced by the detector means, an actuator operable in response to the control signal from the control means, and a rear wheel camber varying mechanism actuatable by the actuator for varying the camber of rear wheels. The control means being arranged such that the control signal produced thereby enables the actuator to operate the rear wheel camber varying mechanism so that the camber of outer and inner rear wheels with respect to a motor vehicle turning direction corresponding to the direction in which the front wheels are steered, is rendered negative and positive, respectively.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
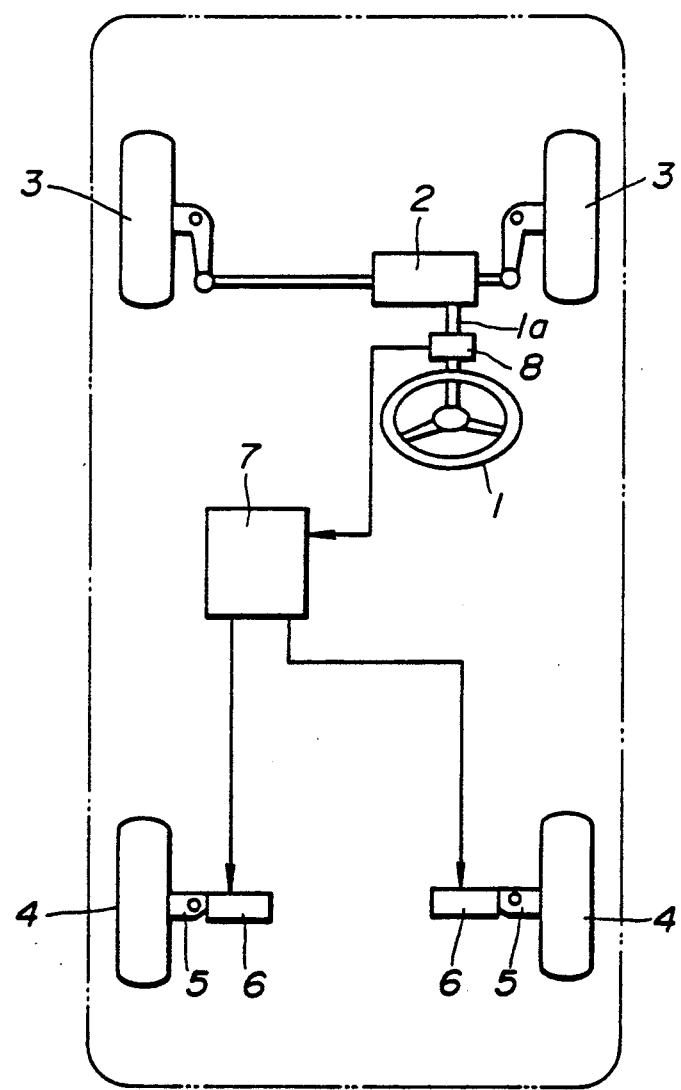
FIG. 1 is a schematic plan view of a motor vehicle incorporating a camber control system according to the present invention.

As shown in FIG. 1, two front wheels 3 are operatively coupled to a steering wheel 1 through a steering gear box 2, a steering shaft 1a, and other members, so that the front wheels 3 can be steered by the steering wheel 1. The direction in which the steering shaft 1a, or the steering direction, is turned is detected by a steering direction detector 8. The camber of two rear wheels 4 is varied by respective camber varying mechanisms 5 actuated by respective actuators 6.

The operation of the actuators 6 is controlled by a control unit 7 which is supplied with a detected signal from the steering direction detector 8 which detects the steering direction of the front wheels 3. In response to the signal from the steering direction detector 8, the control unit 7 applies a control signal to the actuators 6.

Figure 2:
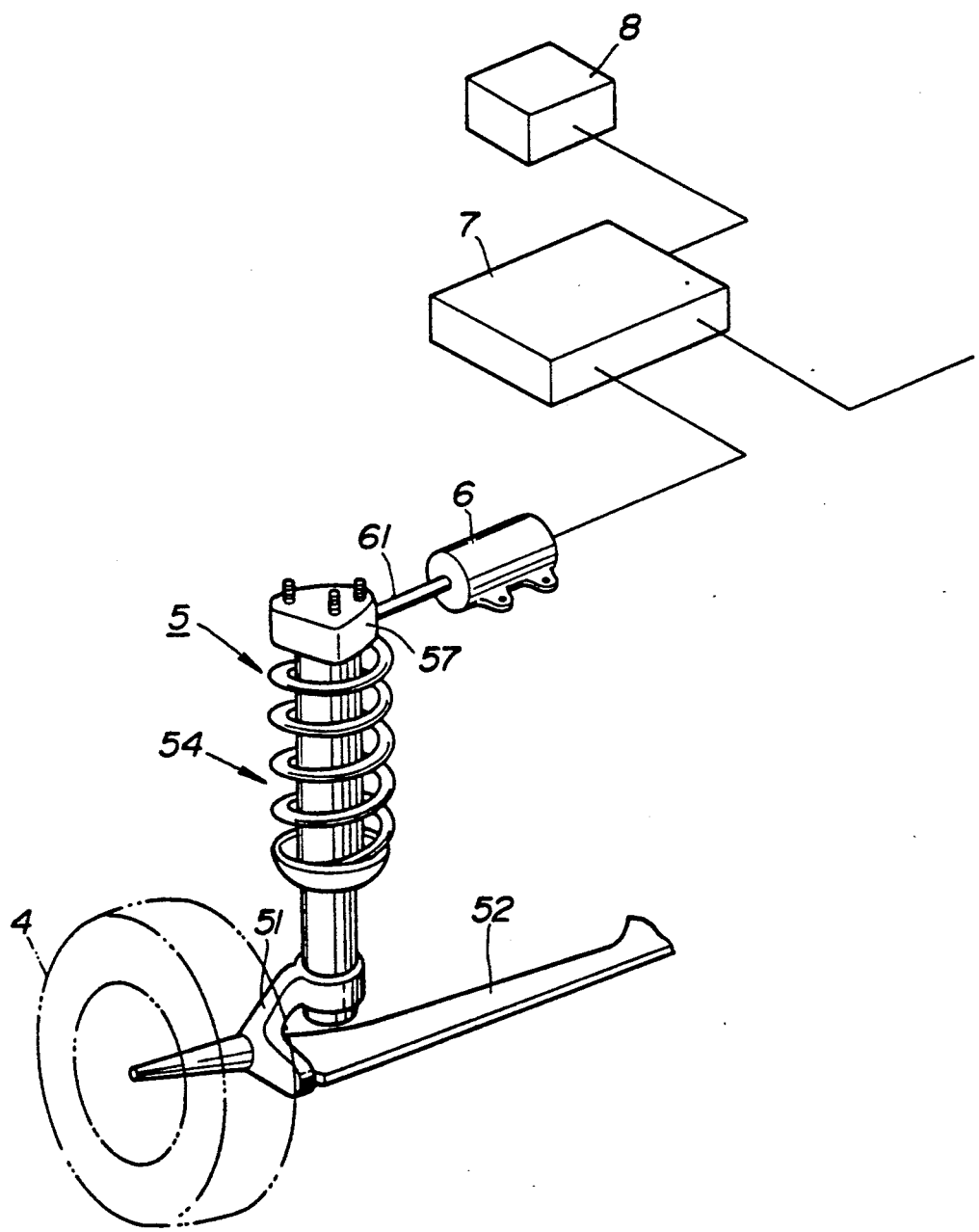
FIG. 2 is a perspective view of a camber varying mechanism according to an the embodiment of the present invention
Figure 3:
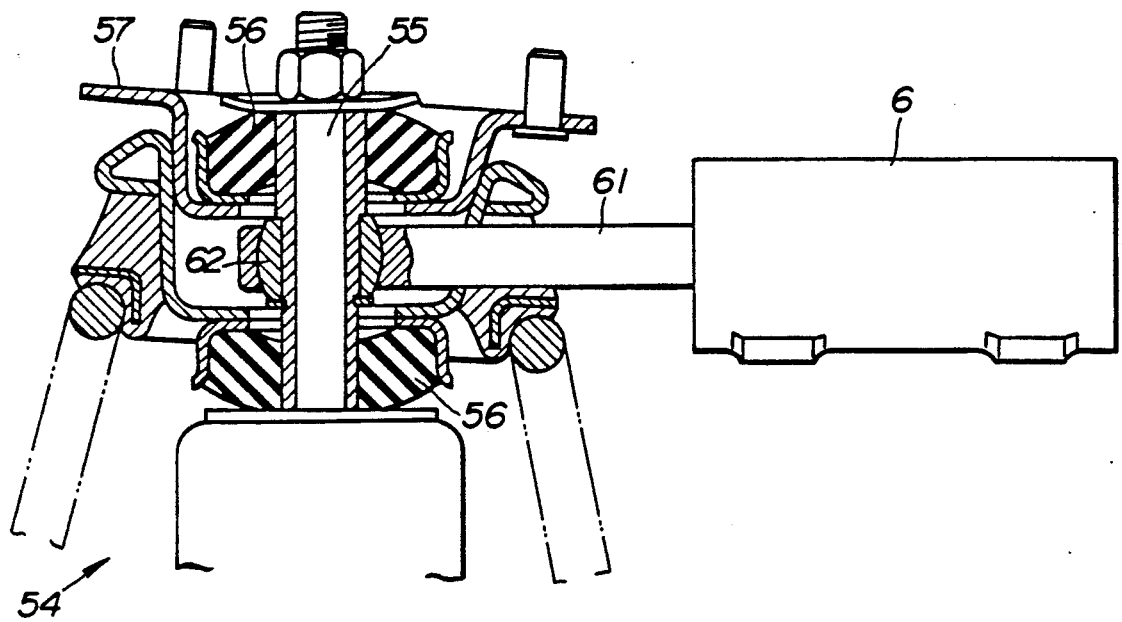
FIG. 3 is a fragmentary vertical cross-sectional view of the camber varying mechanism shown in FIG. 2.

FIGS. 2 and 3 show, in detail, a camber varying mechanism 5 according to an embodiment of the present invention.

As illustrated in FIG. 2, a lower arm 52 is coupled to a lower portion of a knuckle 51 on which the rear wheel 4 is rotatably supported. The upper portion of the knuckle 51 is coupled to the lower end of a hydraulic damper 54 with its upper end connected to the push-pull rod 61 of the actuator 6, the damper functioning as an upper coupling member interconnecting the knuckle 51 and a motor vehicle body. As shown in FIG. 3, the hydraulic damper 54 has a damper rod 55 on its upper end, and a bracket 57 fixed to the motor vehicle body is mounted on the damper rod through upper and lower rubber mounts 56. The actuator 6 comprises a servomotor unit fixed to the vehicle body with the push-pull rod 61 extending transversely of the vehicle body, the push-pull rod 61 having a distal end coupled to an intermediate portion of the damper rod 55 through a ball-and-socket joint 62.

When the actuator 6 is operated, the hydraulic damper 54 coupled at its upper end to the push-pull rod 61 is laterally moved to vary the camber of the rear wheel 4 supported on the knuckle 51.

Figure 4:
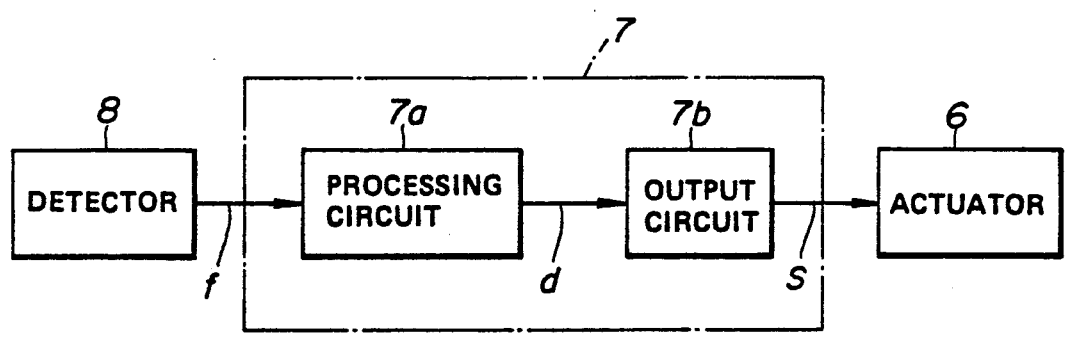
FIG. 4 is a block diagram of a control mechanism.

The control unit 7 is incorporated in a vehiclemounted computer. As shown in FIG. 4, the control unit 7 comprises a processing circuit 7a which processes the signal from the detector 8, i.e., steering direction information f, to produce control information d which varies the camber of both of the rear wheels 4 in the same direction as the steering direction. The control information d is converted from analog to digital signals and amplified by an output circuit 7b of the control unit 7, which is then issued as a control signal s to each actuator 6.

The degree by which the camber of the rear wheels is to be varied during steering operation may be of a preset value or may be variable dependent on the steering speed, the steering amount, or the like.

Figure 5:
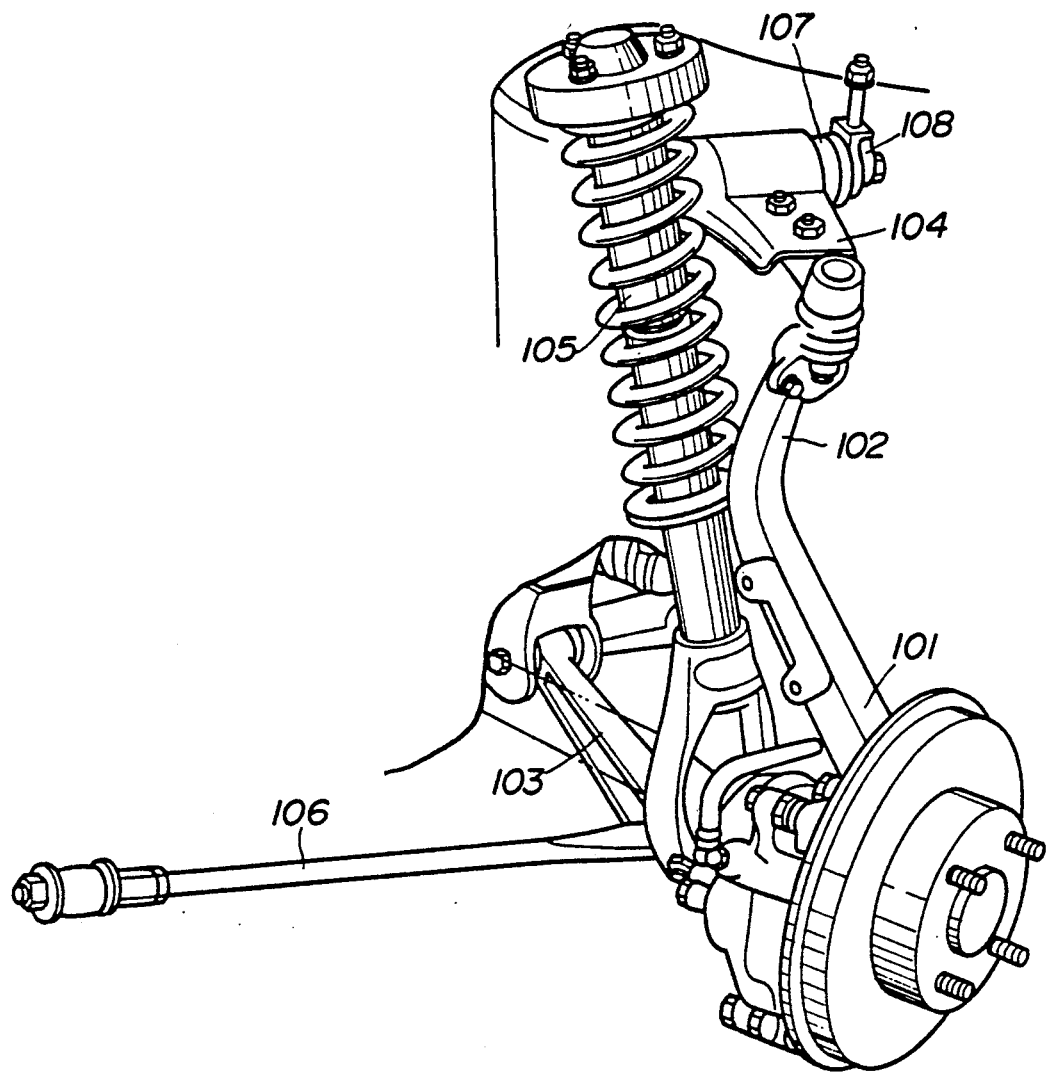
FIG. 5 is a perspective view of a suspension to which the present invention is applicable.
Figure 6:
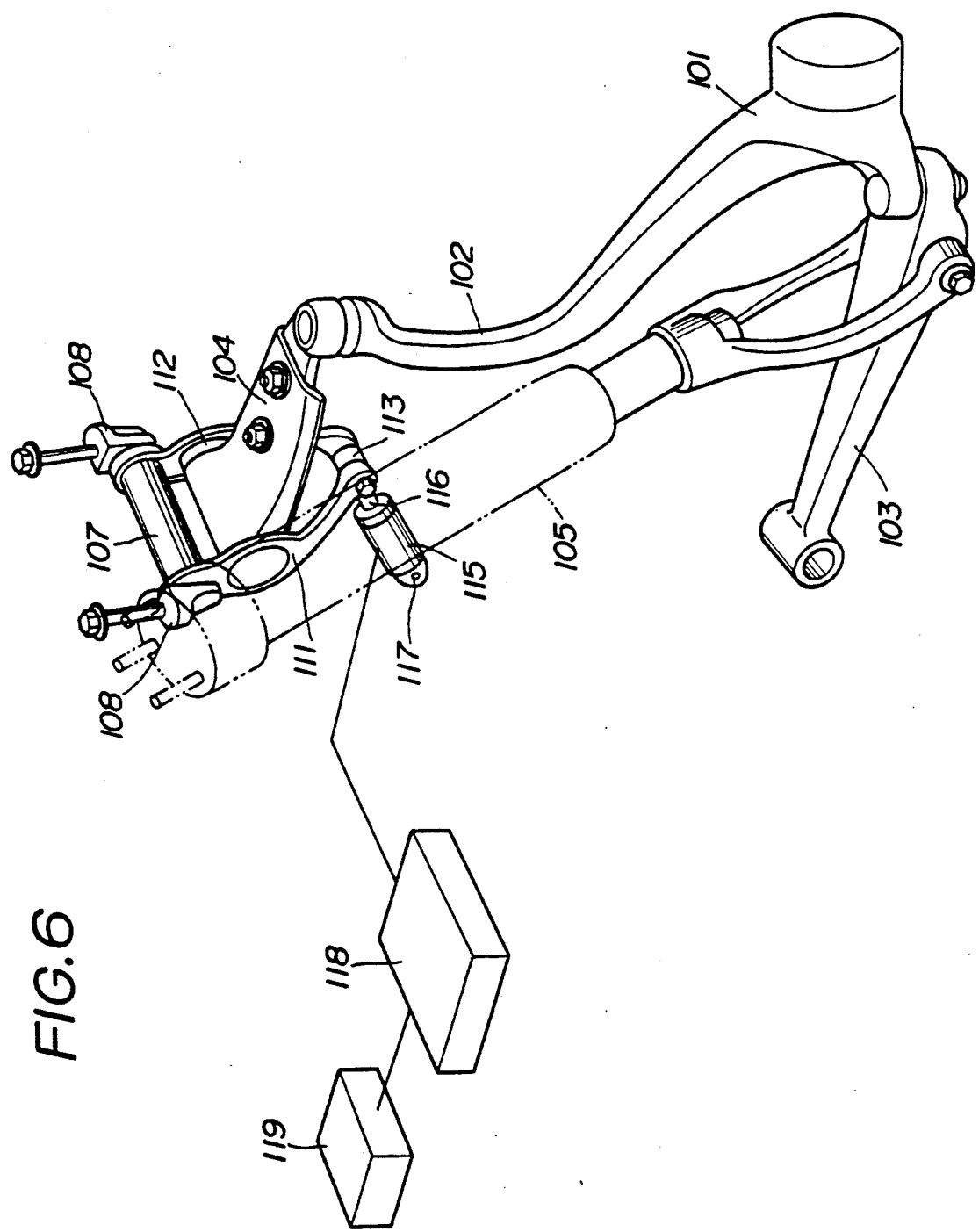
FIG. 6 is a perspective view of a camber varying mechanism according to another embodiment of the present invention, which is combined with the suspension shown in FIG. 5.

FIGS. 5 and 6 show a camber varying device used as a rear wheel camber varying mechanism. FIG. 5 illustrates a wishbone-type suspension with which the camber varying device is associated.

As shown in FIG. 5, the suspension includes a lower arm 103 serving as a lower coupling member connected transversely to a vehicle body, an upper arm 104 serving as an upper coupling member connected transversely to the vehicle body, a hydraulic damper 105, and a radius rod 106.

A post 102 extends vertically from a knuckle 101 on which a wheel (not shown in FIGS. 5 and 6) is rotatably supported. The upper arm 104 has an outer end coupled to the upper end of the post 102, and an inner end pivotally coupled to the vehicle body by a support shaft 107 through a holder 108.

More specifically, as illustrated in FIG. 6, a bifurcated link 111 is pivotally supported at its upper end on the support shaft 107 for swinging movement in the transverse direction of the vehicle body. The link 111 has a support shaft 112 on its intermediate portion, the inner end of the upper arm 104 being pivotally supported on the support shaft 112. An actuator 115 is coupled to a support shaft 113 mounted on the lower end of the link 111. The actuator 115 is in the form of a servomotor unit having a push-pull rod 116 extending transversely of the vehicle body, the actuator 115 being vertically swingably supported by a pivot shaft 117 on the vehicle body (see FIG. 7). The distal end of the push-pull rod 116 is pivotally coupled to the support shaft 113 on the lower end of the link 111.

Operation of the actuator 115 is controlled by a control unit 118. The control unit 118 is responsive to a detected signal from a steering direction detector 119 for producing a control signal to control the actuator 115. The control unit 118 may also/alternatively be responsive to a detected signal from a vehicle speed sensor (not shown) for controlling the acutator 115.

Figure 7:
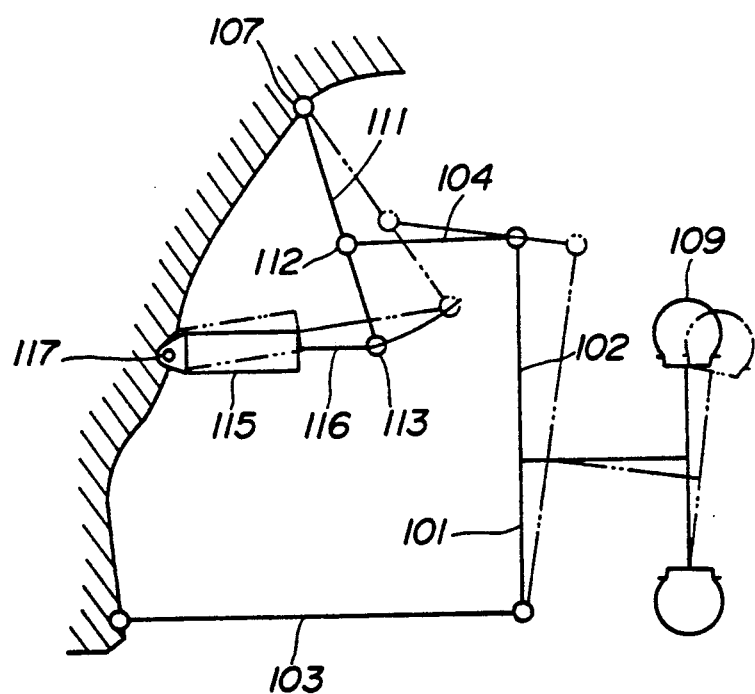
FIG. 7 is a schematic view showing operation of the camber varying mechanism illustrated in FIG. 6.

When the actuator 115 is operated, the link 111 coupled to the push-pull rod 116 is transversely moved to cause the the upper arm 104 coupled to link 111 to move transversely for thereby varying the camber of a wheel 109 supported on the knuckle 101, as shown in FIG. 7.

While the camber varying device is shown as being combined with a rear wheel suspension, it may be associated with a front wheel suspension. The suspension and actuator types are not limited to those illustrated in the embodiments, but may be of any desired design.

With the arrangement of the present invention, the camber of outer and inner rear wheels with respect to a motor vehicle turning direction is rendered negative and positive, respectively, in response to steering operation of the front wheels. Thus, the rear wheels are tilted in a direction toward the center of a vehicle turning circle, so that camber thrusts acting on the rear wheels can positively be utilized to generate cornering forces for an increased steering response when the motor vehicle, as it is traveling changes its course and for improved turning or cornering performance.

Since the actuator is coupled to the upper portion of the upper arm or the hydraulic damper which is attached to the vehicle body for transversely moving the upper arm or the hydraulic damper, the wheel camber can be varied with a relatively small driving force, and any change in the suspension characteristics can be held to a minimum. Where the camber control system is incorporated in an existing motor vehicle, the existing supension components can be used as they are. Further, the actuator is less subject to dust, water, and other foreign matter as it is located in an upper position.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A camber varying device for a motor vehicle having a wheel comprising:
   a wheel supporting member for supporting a wheel rotatably thereon;
   lower and upper coupling members interconnecting said wheel supporting member and a body of a motor vehicle; and
   an actuator means for producing a driving force to vary the camber of the wheel;
   said upper coupling member comprising an upper arm extending transversely of said motor vehicle body and a link having one end pivotally supported on said motor vehicle body for swinging movement in the transverse direction of the vehicle and the other end coupled to said actuator means, said upper arm being connected to an intermediate portion of said link and thereby transversely movable in response to the swinging movement of said link.

2. A camber varying device according to claim 1, wherein said other end of said link is disposed below said upper arm.

3. A camber varying device according to claim 1, wherein said link comprises a bifurcated member pivotally connected at bifurcated ends thereof to said motor vehicle body and a support shaft supported on an intermediate portion of the bifurcated member;
   an inner end of said upper arm is pivotally connected to the support shaft; and said actuator is connected to an opposite end of said bifurcated member.

4. A camber varying device according to claim 3, wherein said other end of said link is disposed below said upper arm.

5. A camber varying device according to claim 3, wherein said bifurcated member is substantially V-shaped.

* * * * *

UNITED STATES PATENT AND TRADEMARK OFFICE
CERTIFICATE OF CORRECTION

PATENT NO. : 5,094,472

DATED : March 10, 1992

INVENTOR(S) : Oyama, et. al.

It is certified that error appears in the above-identified patent and that said Letters Patent is hereby corrected as shown below:

On the Title page, item [22] the application filing date should be changed from "May 9, 1990" to --May 7, 1990--.

Column 4, line 17, change "traveling" to --traveling, --.

Signed and Sealed this

Twenty-fifth Day of May, 1993

Attest:

MICHAEL K. KIRK

Attesting Officer

Acting Commissioner of Patents and Trademarks